United States Patent [19]

Horn et al.

[11] 4,448,557

[45] May 15, 1984

[54] METHOD AND MEANS FOR INHIBITING INTERLEAVING OR CAVE-IN AMONG TABLE TEXT COLUMNS RESULTING FROM COLUMN INSERTION

[75] Inventors: Gary R. Horn; Kenneth O. Shipp, Jr., both of Austin, Tex.

[73] Assignee: International Business Machines Corporation, Armonk, N.Y.

[21] Appl. No.: 305,254

[22] Filed: Sep. 24, 1981

[51] Int. Cl.³ .............................................. B41J 25/18
[52] U.S. Cl. ..................................... 400/279; 400/76; 364/900
[58] Field of Search ............... 400/2, 3, 63, 64, 67, 400/68, 76, 83, 279, 705.4, 705.5; 364/200, 900; 340/720, 721, 723, 724

[56] References Cited

FOREIGN PATENT DOCUMENTS 2801749  7/1978  Fed. Rep. of Germany ...... 400/279

OTHER PUBLICATIONS

IBM Technical Disclosure Bulletin, "Column Revision Without Regard to Adjoining Columns", Shipp, Jr., vol. 24, No. 9, Feb. 1982, p. 4585.
IBM Technical Disclosure Bulletin, "Isolation of a Column from its Table", Horn et al., vol. 24, No. 10, Mar. 1982, pp. 5009–5010.
IBM Technical Disclosure Bulletin, "Insertion of New Columns and Special Handling Rules for Columns with no Gutter", Horn et al., vol. 25, No. 1, Jun. 1982, pp. 209–212.

*Primary Examiner*—Ernest T. Wright, Jr.
*Attorney, Agent, or Firm*—R. Bruce Brodie

[57] ABSTRACT

The automatic tab insertion in those null-entry positions in a tab-stopped positioned multicolumn table having row lines which include text right adjacent the null entries so as to inhibit right-to-left, text-to-null-entry migration in the same row.

4 Claims, 8 Drawing Figures

```
         Col. Insert
           →7.7
           →8.8
           →9.9
         Col.1           Col.2
    <<........_............._...>>
    →     1.1→           4.5 ←
    →     2.2→           2.2 ←
    →     3.3→           1.1 ←
    →     4.4→           3.1 ←
```

```
         Col.1      Col. Insert       Col.2
    <<........_............._.............._...>>
    →     1.1→        7.7→              4.5 ←
    →     2.2→        8.8→              2.2 ←
    →     3.3→        9.9→              1.1 ←
    →     4.4→        ⊝—TAB STOP        3.1 ←
                         ONLY
    NOTE:  → represents a TAB
           ← represents a line end control
    COLUMN INSERT < TABLE
```

```
table left margin                                                                    table right margin
       v                                                                                    v
       *          *            *            *            *           *           *          *
       *<-column-->*<--gutter->*<--column-->*<--gutter->*<-column-->*
       *   width   *            *    width   *            *   width  *
       *     1     *            *      2     *            *     3    *
       *          *            *            *            *           *           *          *
       <<..............................................................,_........,>>
          xxxxxxxxxxx              xxxxxx.xxxx                            xxxx.xx
          xxxxxxxxxx                xxxxx.xxx                             xxxx.xx
          xxxxxxxxxx                xxxxxx.xx                             xxxx.xx
          xxxxxxx                    xx.xxx                               xxxx.xx
          xxxxxxxxxx                xxxxx.xxxx                            xxxx.xx
          xxxxxxxxxxx
       *          *                                                                         *
       *<--column--->*<--------column------->*<--------column-------->*
       *   margin    *         margin         *         margin         *
       *   width     *         width          *         width          *
       *     1       *           2            *           3            *
       *          *                                                                         *
       *<----------------------------table margin width------------------------>*
       *
```

FIG. 4

```
1   procedure regularize(table,column: packedarray[1..n] of char;
                         eot,eoc,tlm,clm,crm,clt,tlt:integer);
2     var i,j,j1,k,jsize:integer;
3     begin (* procedure *)
4       i:=0; j:=0 (* c=cursor position in table, j=cursor position
                                                    in column*)
5       repeat
6         j1:=j; move(column,eoc,j,crm,clt,clm);
7         if j<>eoc then j:=j+1;
8         move(table,eot,i,clm,tlt,tlm);
9         jsize:=j-j1;
10        for k:=eot downto i do table[k+jsize]:=table[k];
11        eot:=eot+jsize;
12        for k:=1 to jsize do table[i+k]:=column[j1+k];
13        while table[i]<> ord(rcr) and i<>eot do i:=i+1;
14        if i=eot and j<>eoc then
                begin eot:=eot+1; table[eot]:= ord(rcr) end(*if*);
15      until i=eot and j=eoc;
16    end (* procedure regularize *);
17  procedure move(buffer: packedarray[1..n] of char;
                  eob,cursor,dest,lastab,lm:integer);
18    var k,cesc:integer;
19    begin (* procedure *)
20      cesc:=lm;
21      repeat cesc:=cesc+escapement(buffer,cursor);cursor:=cursor+1;
22      until cesc>dest or buffer[cursor-1]= ord(rcr) or
                (cesc=dest and buffer[cursor-1]+ ord(tab));
23      if buffer[cursor]= ord(rcr) then
24        while cesc<lastab and cesc<dest do
25          begin
26            for k:=eob downto cursor do buffer[k+1]:=buffer[k];
27            eob:=eob+1;buffer[cursor]:= ord(tab);
28            cesc:=cesc+escapement(buffer,cursor);cursor:=cursor+1;
29          end (* while-do *);
30        end (* if *)
31  end (* procedure move *);

(*eot = end of table, eoc = end of column, tlm = table left margin,
  clm = column left margin, crm = column right margin,
  clt = column last tab stop, tlt = table last tab stop,
  eob = end of buffer, dest = destination, lm = left margin,
  cesc = cursor escapement                                   *)
```

FIG. 8

METHOD AND MEANS FOR INHIBITING INTERLEAVING OR CAVE-IN AMONG TABLE TEXT COLUMNS RESULTING FROM COLUMN INSERTION

FIELD OF THE INVENTION

This invention relates to word processing and more particularly to managing the consequences of column insertion in the copying and moving of text columns in a multicolumn table in an interactive word processing system.

BACKGROUND ART

The position formatting of a character string with reference to a fixed position such as a left margin in a line oriented soft copy (display) or hard copy (printer) output involves recursive formatting. Thus, the first character is formatted with respect to the margin and subsequent characters are aligned to the previous aligned characters in the character string. In the cursored electronic display of text character strings, it is known to use a horizontal scale line (tab rack) across the display upon which can be registered tab stops. A tab character in the text character string is a formatting control which tells the system to interrogate the tab rack, and if there is a tab stop, the system formats the next text character at the position following the tab character. Consequently, a left margin will have its position indicated by a tab stop along the left end of the scale line. The first tab character in the text stream will be formatted with respect thereto.

A multitext column table has each column position tab stopped along the scale line. The intercolumn intervals are filled with space characters. A multicolumn table consists of multiple horizontal lines or rows. The column entries for each row include a tab character followed by one or more text characters. Each tab character causes the system to look to the next consecutive tab stop to define the position for the immediately appended text characters to be positioned on the display as the counterpart column entry. Suppose, a new column having one or more null-entries is inserted between a pair of adjacent columns. Upon building the table a row at a time while executing this copy/insertion function, the system will fail to recognize the null-entry and will proceed to insert the next tab and text of first right adjacent column having a text entry and write it into the null-entry position of the inserted column for that row. This phenomenon is termed "migration" or "interleaving". A parallel problem arises when a column of text characters is to be inserted between a pair of columns having at least one null-entry counterpart left adjacent to the text entry of the inserted column on the same row. Here, the text column entry will migrate to the "hole" no-entry counterpart in the same row of any left adjacent column. Further, a veritable collapse or "cave-in" may occur where inserted or copied columns are longer than or shorter than other columns in the table.

Prior art word processing systems attempted to control the migration or collapse of column entries and columns by establishing a keying rule that the operator would follow. This meant that the operator had to remember to type extra tabs at the end of any line that did not contained the specific entry for every column. This would wreak havoc in an actual bulk transcription.

THE INVENTION

The technical advance of this invention is the automatic tab insertion in those null-entry positions in a multicolumn table whose right adjacent column entries on the same row lines include text entries. The tab inserts are made in order to inhibit right-to-left column entry migration and cave-in. The machine step replaces manual tab insertion prior to the end of line or row required carriage return.

The placing of a first column between other columns arises out of column block operation such as the copying or moving. The text column to be inserted into the table may have column text entries right adjacent on the same row lines as null entries of the column to be inserted. Likewise, the table columns left adjacent to the inserted column may have null entries on the same row line as text entries of the inserted column. The 'hole' left adjacent a text entry also occurs where an inserted text column is shorter than right-adjacent columns. It is necessary to automatically place a tab in each null-entry position of the inserted column at least up to the length of the longest right- adjacent column in the table. Relatedly, where an inserted column resides in a table, at least one of whose left-adjacent column lengths is less than that of the inserted column, then automatic tab placement must be made in each null-entry position on each row line of the column left- adjacent to the inserted column.

BRIEF DESCRIPTION OF THE DRAWING

FIG. 8 represents a PASCAL source code implementation for automatically inserting tab stops under the varying relative lengths and null insert conditions.

DESCRIPTION OF THE PREFERRED EMBODIMENT AND INDUSTRIAL APPLICABILITY

Figure 1:
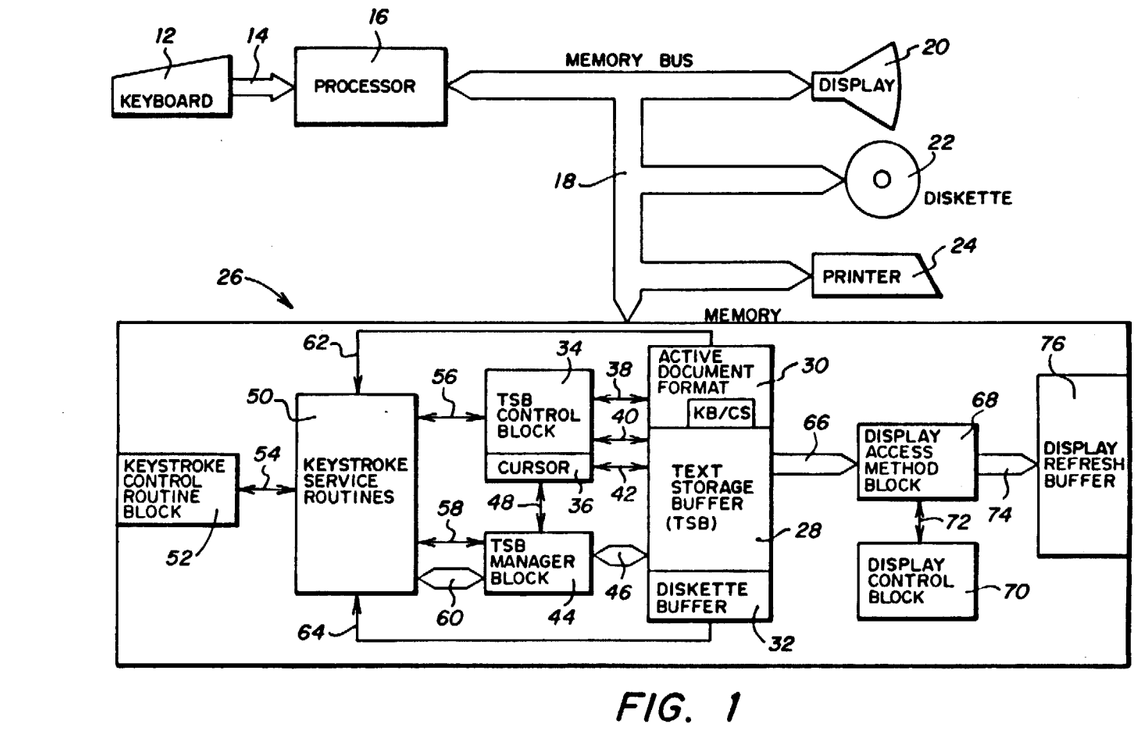
FIG. 1 depicts an interactive word processor system configuration including soft and hard copy output facilities, internal and external memory, a keyboard, and an intercoupling microprocessor.

Brief System Machine Description Referring now to FIG. 1, there is shown a word processing system 10 which includes a keyboard 12 for receiving text character entries and transmitting the text to a path 14 to a microprocessor 16. A memory bus 18 couples processor 16 to a CRT display 20, diskette drive 22, a printer 24, and a random access memory 26.

An operator enters a text stream through keyboard 12. Each page of text is stored and processed in memory 26. As the text stream is received in the memory 26, it is simultaneously presented to display 20. After the buffering of the text in text storage buffer 28 of memory 26, the stream can be saved on diskette drive 22 or hard copy outprinted on printer 24.

Memory 26 includes a number of data areas and functional programs for operation with the text stored in system 10. The text and related control function are saved in text storage buffer 28 which inculdes active document format storage section 30 and a diskette buffer 32.

As each character is entered through the keyboard 12, it is processed by one or more of the keystroke service routines stored in memory location block 50 as executed by processor 16. Also, the text stream stored in the text storage buffer 28 is simultaneously entered into display refresh buffer 76. This buffer 76 drives display 20. The display control block 70 and display access method block 68 provide a window which may be scrolled relative to the contents of TSB 28. It should be noted that both the diskette drive 22 and printer 24 have dedicated buffer areas assigned thereto. Lastly, bock 70 serves to store flags and status information as required by the operation of block 68.

As the operator enters each keystroke at keyboard 12, a corresponding signal is transmitted to processor 16 over path 14 which enters the keystroke command to the memory 26. Upon receipt, the keystroke routine is invoked for block 50 in order to process the keyed command. This is executed by processor 16 accordingly as to whether it is a control command or a graphic command (text character) entry. The processing result is entered into TSB 28. While graphics and commands are built-up in TSB 28, the text information is retained in display refresh buffer 76 and presented at display 20.

By actuating a control command, an operator can transfer information about the memory 26, display 20, diskette drive 22, and printer 24. Indeed, selected pages can be called from the diskette drive 22 and the memory 26 so that the operator can make changes and corrections to the text and then reenter the corrected text into diskette drive 22 or have the corrected text hard copied on printer 24.

Partial Machine Register Organization, Data, and Control Flow

Figure 2:
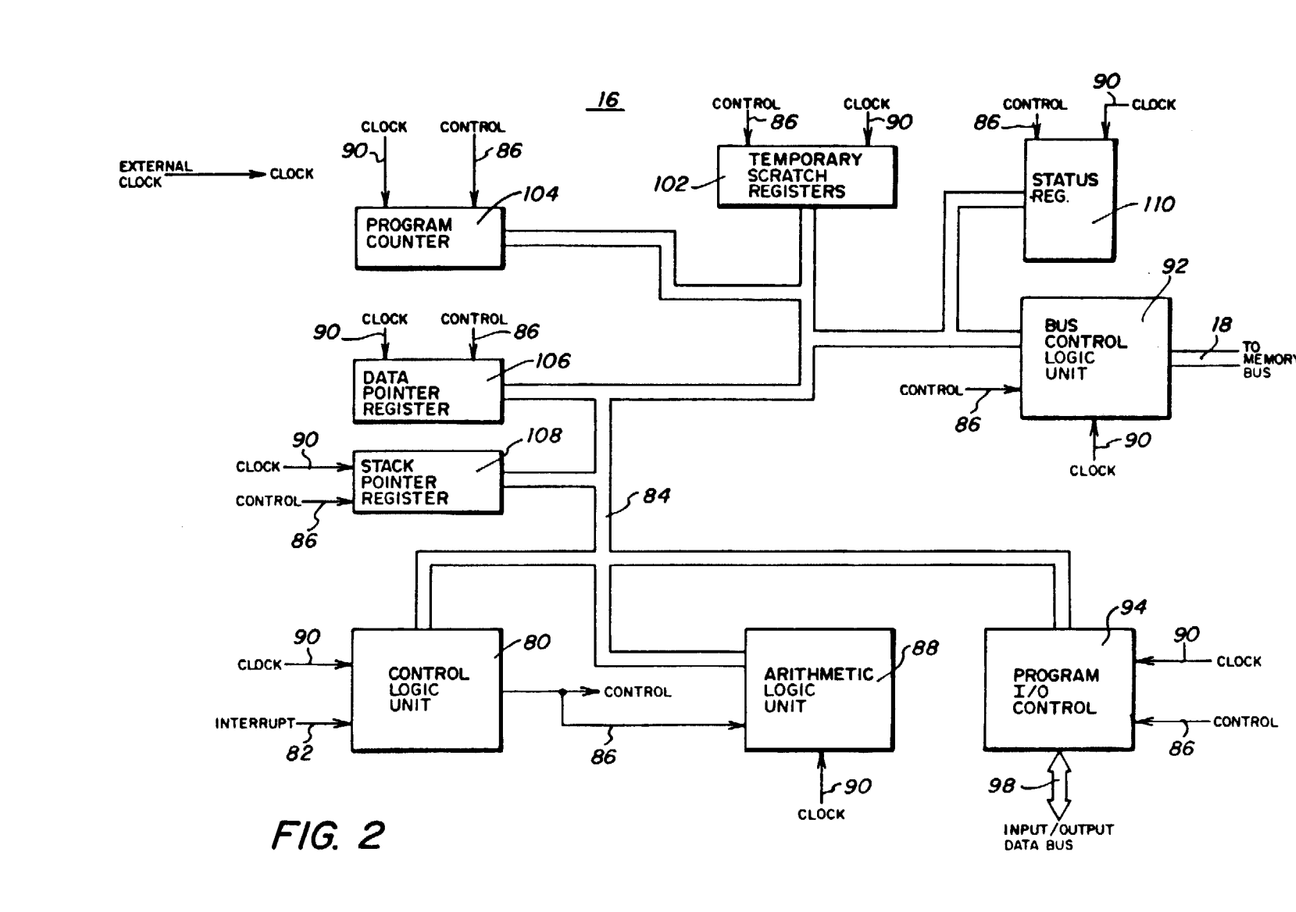
FIG. 2 delineates a partial register organization of the microprocessor shown in FIG. 1.

Referring now to FIG. 2, there is illustrated the contemporary machine register organization of processor 16. Such a processor 16 may be commercially implemented as for example by an Intel Corporation microprocessor model 8086. According to FIG. 2, the processor 16 includes a control logic unit 80 which responds to an interrupt on device bus 82 from keyboard 12. Logic unit 80 is also connected to a data and address bus 84 intercoupling other logic elements.

In response to a fetch instruction from random access memory 26, logic unit 80 generates control signals to other elements. The signals are coupled by way of path 86 shown illustratively connecting ALU 88. Synchronous operation of unit 80 and other logic elements is ensured by way of clock pulses from an external clock source transmitted over path 90. Data and instructions to be executed by processor 16 are entered over logic unit 92. Data also may be entered by way of a programmed input/output logic unit 94. Logic unit 92 couples storage elements of RAM 26 and receives instruction by processing data from the I/O control logic 94 or from RAM 26.

Device control information from processor 16 is pathed by I/O control logic 94 and path or data bus 98. Input on the data bus 98 from keyboard 12 is processed internally through processor 16 by instructions over bus 84 to logic unit 80 by ALU 88. The ALU 88 in response to a signal on path 86 and in accordance with instructions received on bus 18 executes arithmetic operations stored in temporary scratch register 102.

Referring again to FIG. 1, text storage buffer control block 34 serves as the data area for the text storage buffer 28. A cursor control section 36, is included within the text storage buffer control block 34. Block 34 is linked through a channel 38 to the active document format storage section 30 and through a channel 40 to the text storage buffer 28. The cursor block 36 is connected through channel 42 to the text storage buffer 28. A text storage buffer manager block 44 is coupled through a channel 46 to the next storage buffer 28. Buffer manager block 44 is further coupled through channel 48 to the TSB control block 34.

As each character is entered through keyboard 12, it is received at the memory 26 by the actions of one or more keystroke services routines in memory location block 50. A keystroke control unit block 52 is linked to the keystroke service routine in memory location block 50 through a channel 54. The keystroke service routine in memory location block 50 is further linked through a channel 56 to the text storage buffer control block 34 and through channels 58 and 60 to TSB manager block 44.

The active document format storage section 30 is connected through channel 62 to the keystroke service routine in memory location block 50. The diskette buffer 32, in turn, is coupled through channel 64 to the keystroke service routine in memory location block 50.

The text characters and control information in TSB 28 are communicated through channel 66 to a display access method block 68. This serves as an interface for the display 20. Corresponding access method blocks for the keyboard 12, diskette drive 22, and printer 24 are substituted when communications with these units is required. Display control block 70 is connected through path 72 to the access method block 68. An external clock and from said method block 68 to display refresh buffer 76 over path 74 acessing elements of the machine. Indeed, a clock input is provided at each of the major elements over path 90. As can be seen with reference to FIG. 2, a conventional microprocessor architecture is set out. For example, a program counter 104, when incremented by the external clock over path 90, specifies the location either in a register or in a memory for the next instruction to be executed. Also, data pointer register 106 and stack pointer register 108, respectively, contain pointers to the address location for recently entered characters and the location in memory of the instruction stack. The instruction stack is a last-in, first-out stack used for procedure and function calls, the storage of static variables, and temporary values during expression evaluation. Register 110 is a status register indicative of availability for content error.

Prompting Word Processor Display

Figure 3:
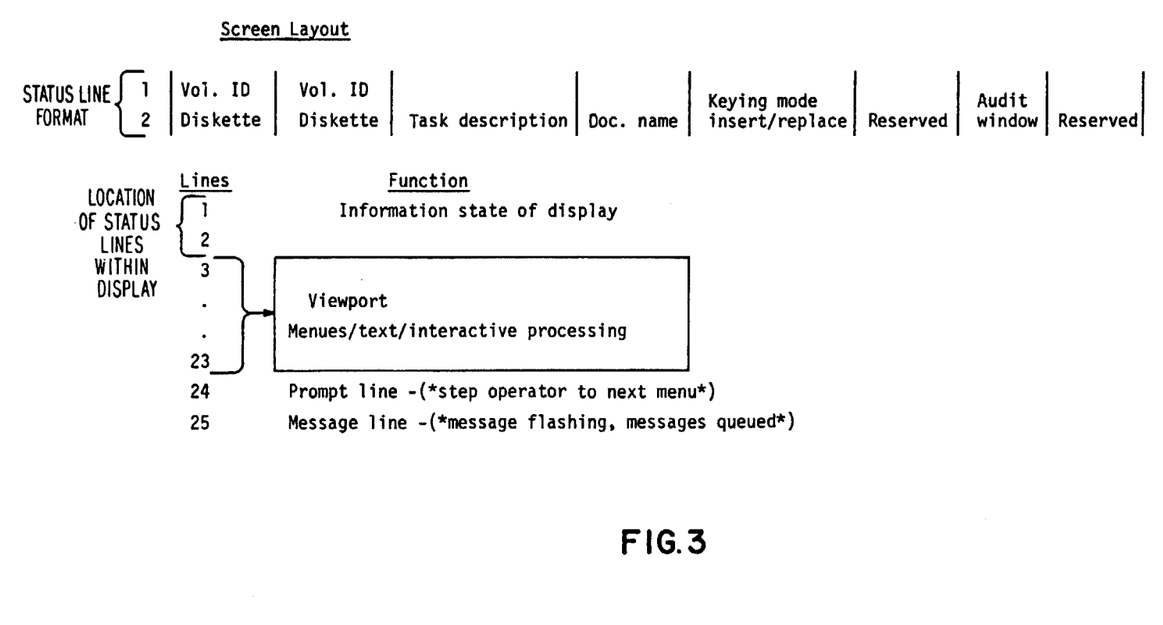
FIG. 3 is a display screen (soft copy) layout organization of the information as viewed by a word processor operator.

In a prompting word processor, display 20 is of the CRT type and is capable of setting out monospaced characters. In this regard, reference should be made to FIG. 3. A typical display is partitioned such that lines 1 and 2 are status lines reflecting the information state of the display. Next, lines 3 through 23 define a viewport in which are set out menus, text, and information necessary for interactive processing. Line 24 is a prompt line which provides information stepping the operator to the next menu function or activity. Lastly, line 25 is a message line which indicates whether messages are flashing or queued.

Column and Gutter Definition

Figure 4:
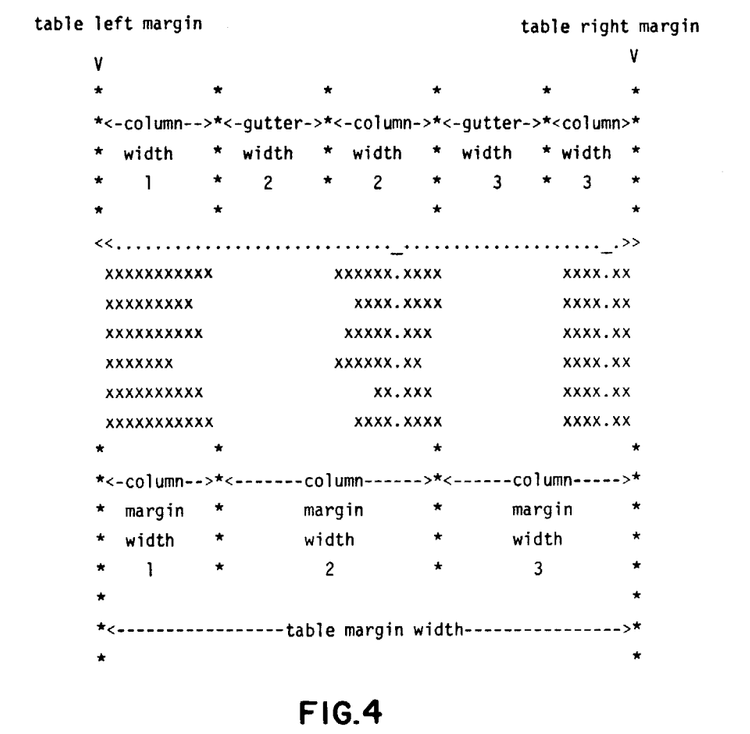
FIG. 4 shows table and column layout spatial definitions.

Referring now to FIG. 4, there is shown the gutter and column width parameters specifying a set of adjacent vertical columns starting at the table left margin and extending to the right margin. Column and gutter widths are defined in terms of the width of the character included within a predetermined font or in absolute escapement units such as 1/1440 inches per unit. In this regard, a column width is preferably a multiple byte number designating the width of a column text as the number of character units counted relative to the preceding gutter. Likewise, a gutter width is a multiple byte number designating the amount of white space and character widths associated with a vertical column.

Column Layout Operations

Among column block operations which an operator may invoke on an interactive word processing system are those of column move and column copy. These functions operate only on those tables that have been previously laid out in copending applications by Horn and Shipp, U.S. Ser. No. 305,255, filed on Sept. 24, 1981; U.S. Ser. No. 305,260, filed on Sept. 24, 1981; and U.S. Ser. No. 305,251, filed on Sept. 24, 1981.

These applications describe column layout functions in an interactive prompting word processing system where an operator may specify all of the attributes of a column table format. These attributes include the widths of each column, the tab stop scale line setting, and the spacing (gutters) between columns.

An Overview of Column Block Operations

The basic operator protocol for column block operations includes the steps of positioning a cursor on the first column entry of the column to be moved or copied, stroking the counterpart function key (MOVE/COPY), moving the cursor to the insertion point and stroke another function (ENTER) key. Whether an operator moves/copies a column within the same or another table, the tab rack of the same or source and destination tables will be updated. Furthermore, the method of this invention ensures that the carrier returns and tabs will automatically be provided by the system as shown in FIG. 1 to ensure the integrity of the column within the destination table.

Tab Insertion Among Columns of Dissimilar Length

Figure 5:
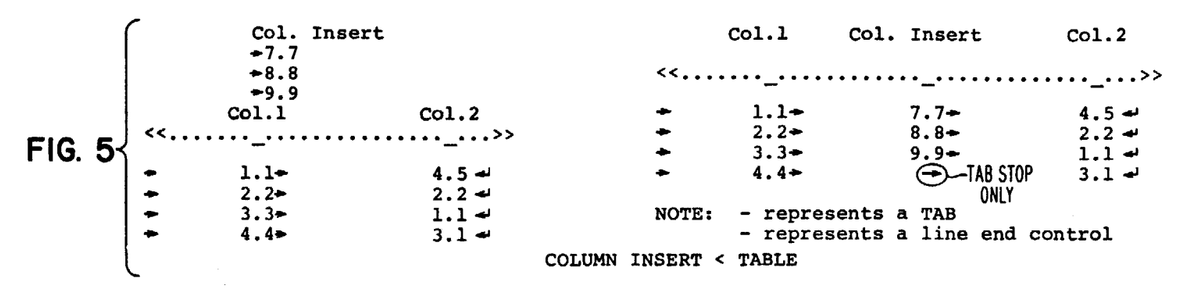
FIGS. 5–7 depict the null-entry tab insert positions when placing a column insert that is shorter than the table (FIG. 5), longer than the table (FIG. 6), and having intermediate null-entries (FIG. 7).

Referring now to FIG. 5, there is shown a display oriented illustration of column insertions into a table implementing a column block operation where the column insert length is less than that of the table column length. On the FIG. 5 left is shown a multicolumn table display having the tab rack (scale line) including two centered tab stops defining display positions of the respective first and second columns. On the tab rack left end, there is shown a column of tabs defining a left margin. Columns 1 and 2 each have four entries. Each of the entries in column 1 is tabbed while each of the entries in the right hand column 2 is suffixed by a line end control character. The column to be inserted between column 1 and 2 is shorter than either column having only 3 entries. Since sequential processing proceeds from left to right, this means that a null-entry in a row position of a left adjacent column permits migration of a text character entry in the immediate right adjacent row position, and it is necessary to tab insert the null entry in the fourth column position of the inserted column.

Figure 6:
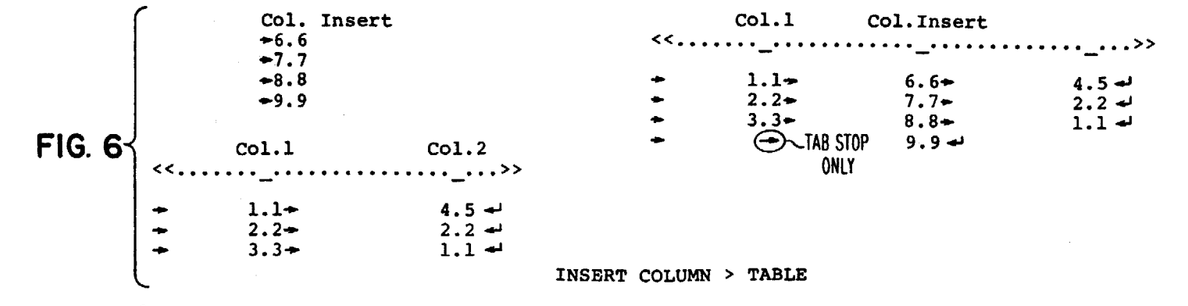

In FIG. 6, the inserted column has four row text character entries and is thus longer than the three row entry columns 1 and 2. The only migration problems would be from the fourth row text entry of the inserted column to the fourth row null-entry of the first column. This is inhibited by a tab inserted in column 1, row 4. Only an end of line character is needed after the fourth column insert position in view of the fact that the column 2 has only three entries.

Figure 7:
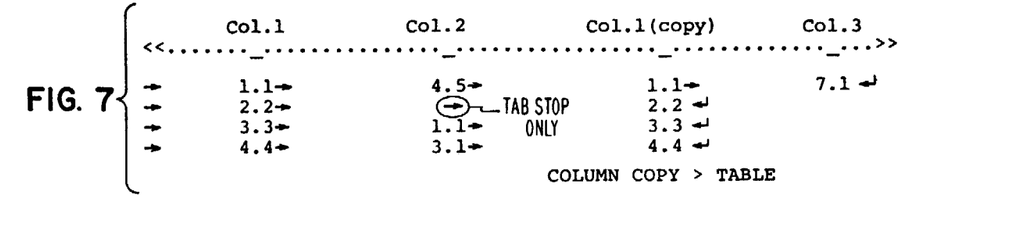

FIG. 7 illustrates the change in which a column copied into another position within a table can render a stable table subject to migration or cave-in. Observe that in the absence of copying column 1 between columns 2 and 3 no column has a null-entry in the left adjacent column on the same row. However, when column 1 is copied between columns 2 and 3, the null-entry in the second row of column 2 is left adjacent to the text entry on the second row in the copied column 1. This requires a tab insert into the column 2 null-entry. The term "null-entry" should be taken to mean that no alphanumeric character is entered into a given row position. Only a tab stop is entered where appropriate.

A PASCAL Source Code Implementation

A PASCAL source code implementation of the machine response to column insertion in a tab stop positioned multicolumn table is set out in FIG. 8. PASCAL is a well-known high level source code programming language suitable for use in devising control and operating system programs, the object code of which, upon execution in an interactive word processor, suitably implements the method steps of the invention. The PASCAL language is well appreciated in the art. Reference can be made to Jensen and Wirth, "PASCAL User Manual and Report", Second Edition, Springer-Verlag, 1974; and Wirth, "Algorithm Plus Data Structures Equal Program", Prentice-Hall Series in Automatic Computation, 1976. Relatedly, the language has been adopted as an ISO Standard. PASCAL compilers are resident in microprocessors, as for example the UCSD PASCAL in the Apple II Plus Computer System made by the Apple Computer, Inc., Cupertino, Calif.

The "procedure regularize" is invoked by those column operations (not described) which require measuring escapement and insertion of place holding characters. Examples of such column operations are the column block copy and move operations. Such column operations pass to "procedure regularize" all of the table and column to be inserted as formatting parameters. The multitext column table is represented by a parameter "table" which is a packed array of type characters consisting of a row-wise arrangement of text characters, null-entries, and embedded controls. Thus, the table would be epigramatically illustrated as "row 1 (column 1), row 1 (column 2), ... row 1 (column n), rcr, row 2 (column 1), row 2 (column 2), .. row 2 (eoc), .. . rcr,". The column to be inserted is a packed array of type characters having an indexed number of entries and being thought of as row 1 (column j), row 2 (column j), ... row j, last tab stop (tlt). The remaining table formatting parameters are of type integer and define the end of table, table left margin, column left margin, column right margin, column last tab stop, and table last tab stop. In the language of PASCAL, a "data type" defines the set of values which a variable may assume. More particularly, a "type integer" is a variable in an implementation defined subset of integers.

The variables associated with "procedure regularize" are global with respect to "procedure move". Each of the variables are of type integer and all are in the nature of auxiliary variables. Thus, "i" defines the table cursor position, "j" is the column cursor position. "k" is an index variable used in the "for loops" set out on lines 10, 12, and 26.

Structurally, "procedure regularize" scans a table, a row at a time, through each cycle of the "repeat-until loop" between lines 5 to 15. The first scan is to identify the location of the place holding tabs. The next scan is to identify the insertion point for the column entry to be inserted in the table from the array labeled "column". Lastly, it is desired to automatically insert a tab character in any null-column entry of a row which would otherwise permit a text entry migration from a right adjacent to left adjacent column along the same row.

The last prefatory note, relates to the fact that "procedure move" is invoked twice during each "repeat-until loop" execution cycle in "procedure regularize". The first occurs on line 6 where the insert column entry and other column defining parameters replace counterpart formal parameters in "procedure move". Likewise, the invocation represented on line 8 involves passing parameters defining a table column entry and selected table formatting parameters. These two replace their formal parameter counterparts in "procedure move". Inspection should reveal that both the value and formal parameters have the same counterpart data types.

The execution of "procedure regularize" starts on line 4 where the table cursor position i and the inserted column cursor position j are both assigned the value φ meaning that they are moved to the first or starting character positions in both packed arrays. The "repeat-until loop" is invoked on line 6 where the auxiliary variable j is assigned the location start of the column. This is invoked by a call for the "procedure move" for the purpose of seeing whether that column entry requires a place holding tab on the row into which it will be inserted in the table. Line 7 increments the column cursor if the cursor is not at the end of column position. This is followed on line 8 by the second call for "procedure move" which passes the parameters, including the table-packed array to "procedure move". "Procedure move" scans the row entries of the table to determine the column entry insertion point. Lines 9–12 effectuate the insertion of a column entry at that point in the row of the table. This is achieved by assigning the table array value at the cursor-plus-offset entry to the column array value at its cursor-plus-offset position. In order to make room for the insertion, a "hole" is made in the table row by appropriate shifting of the table row entry by the "for loop" on line 10. The "while do loop" on line 13 is to increment the table cursor by +1 as long as the table cursor is not at the end-of-table position.

The conditional statement on line 14 is directed to detecting that the column is longer than a table entry. Whereupon, it is necessary to increase the length of the table and also insert an extra required carrier return.

"Procedure move" uses a set of formal parameters, including a packed array named "buffer" and a cursor named "cursor". The variable "CESC", representing cursor escapement is set to the left margin in Statement 20. A "repeat-until loop" on lines 21 and 22 execute a scan for the column right margin when scanning the column to be inserted, or the left margin when invoking the table parameters. The next value on line 22 involves the cursor decrement by one so as to move the point of operation to the cursored character. The conditional statement on line 23 tests for a null entry. Significantly, the "while do loop" between lines 24 and 29 serves the purpose of identifying the existence of a column null-entry and a right-adjacent column text entry. At this point a tab is inserted in the linear string in the appropriate position.

The PASCAL source-code implementation was selected to express aspects of the invention in view of its compactness and currency among persons having ordinary skill in this art. Other method implementations can be formulated in assembly-level language as, for example, set out in Osborne, "8080 Programming for Logic Design", Sybex, Berkeley, Calif., 1976.

While the invention is particularly described with reference to a preferred embodiment, it is appreciated that its departure from the prior art is to automatically insert tabs so as to avoid the entry migration in column collapse occasioned by operator error in manually keying insert tabs when executing column block operations of "copy and move" involving column insertion into a multicolumn table.

It will be further understood by those skilled in this art that various other changes in the form and details may be made therein without departing from the spirit and scope of the invention.

Having thus described our invention, what is claimed as new and desired to secure the Letters Patent is:

1. In the insertion of a first-text column into a tab-stop positioned multicolumn table, the table having right-adjacent column text entries on the same row line as null entries of the first column, the column insertion being executable on an interactive stored program controlled word processing system, a method for inhibiting interleaving or cave-in among entries from dissimilar columns comprising the program executable steps of:
   merging the row entries of the first column within the table in a single pass and including identifying each first column null entry and right adjacent text entry, and inserting a tab into the identified null-entry positions.

2. In the insertion of a first-text column into a tab-stop positioned multicolumn table, the table having at least one left-adjacent column null entry on selected row lines counterpart to the text entries of the first column, the column insertion being executable on an interactive stored program controlled word processing system, a method for inhibiting interleaving or cave-in among entries from dissimilar columns, comprising the program executable steps of:
   merging the row entries of the first column within the table in a single pass and including identifying each null entry position on each row line of the table column left adjacent to the first column, and inserting a tab into the identified null entry positions.

3. In the insertion of a first column into a tab-stop positioned multicolumn table at least one of whose right-adjacent column lengths exceeds that of the first column, the insertion being executable on an interactive stored program controlled word processing system, a method for inhibiting interleaving or cave-in among entries from dissimilar columns, comprising the program executable steps of:
   merging the row entries of the first column within the table in a single pass and including identifying each null-entry position of the first column at least up to the length of the right adjacent column, and inserting a tab stop into each identified null-entry position.

4. In the insertion of a first text column into a tab-stop positioned multicolumn table at least one of whose left-adjacent column lengths is less than that of the first column, the insertion being executable on an interactive stored program controlled word processing system, a method for inhibiting interleaving or cave-in among entries from dissimilar columns, comprising the program executable steps of:

merging the row entries of the first column within the table in a single pass and including identifying each null-entry postion on each row line of a table column left adjacent to the first column, and inserting a tab stop in each identified null entry position.

* * * * *